April 2, 1929.  J. L. VAUGHN  1,707,290
AUTOMATIC PHONOGRAPH
Original Filed Sept. 7, 1921  8 Sheets-Sheet 1

INVENTOR
John L. Vaughn
BY Chas. E. Townsend
ATTY.

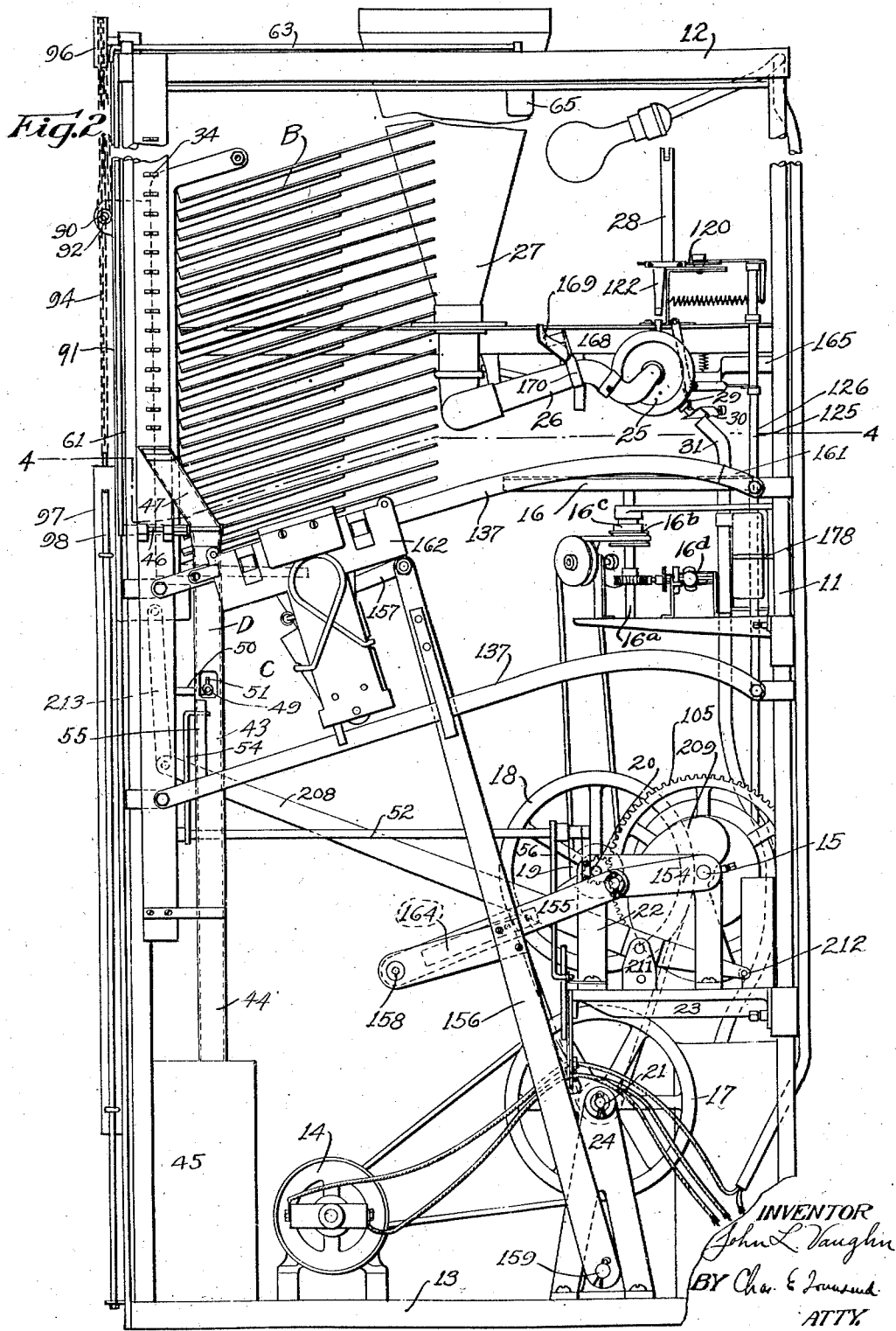

April 2, 1929.　　　J. L. VAUGHN　　　1,707,290
AUTOMATIC PHONOGRAPH
Original Filed Sept. 7, 1921　　8 Sheets-Sheet 3
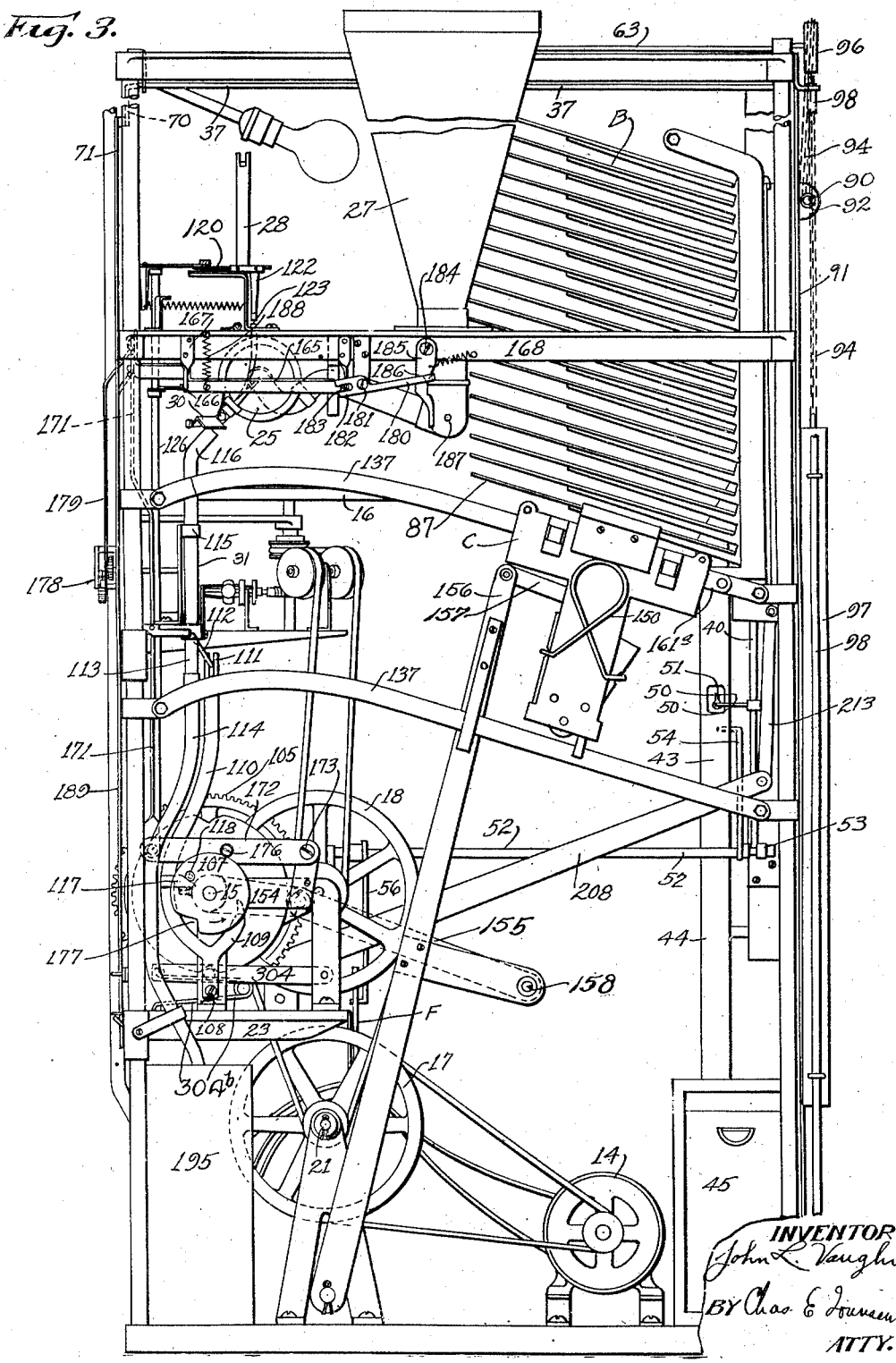

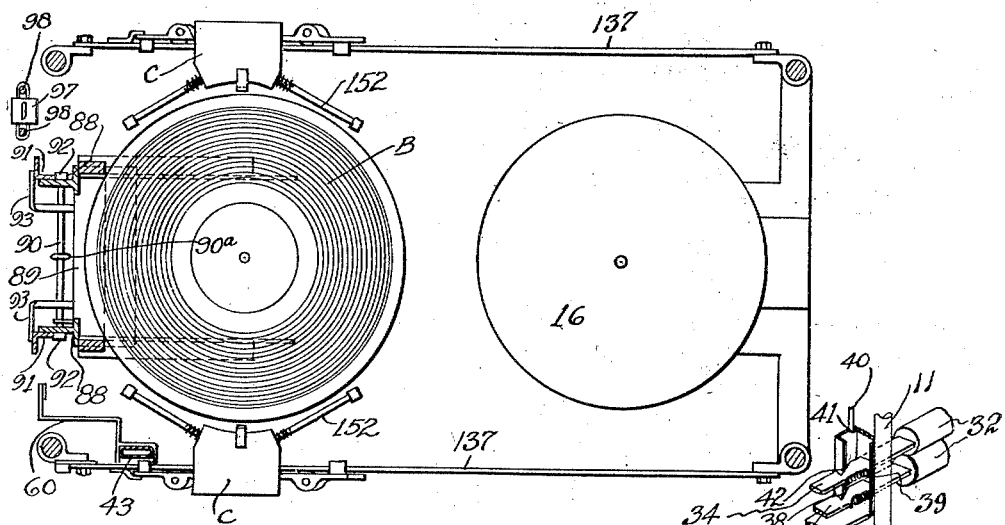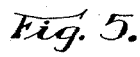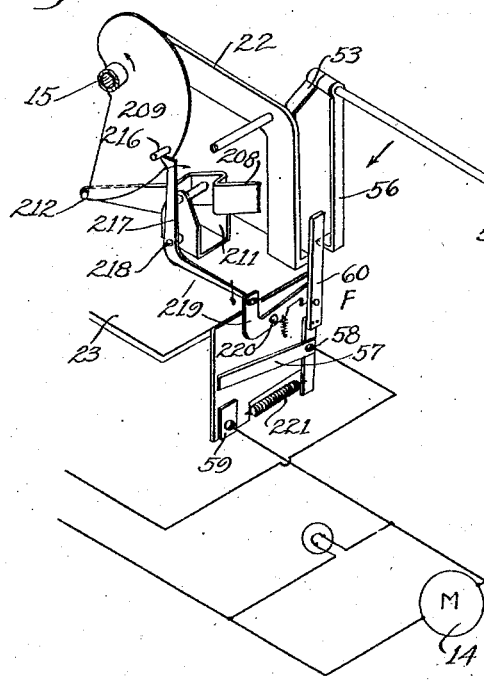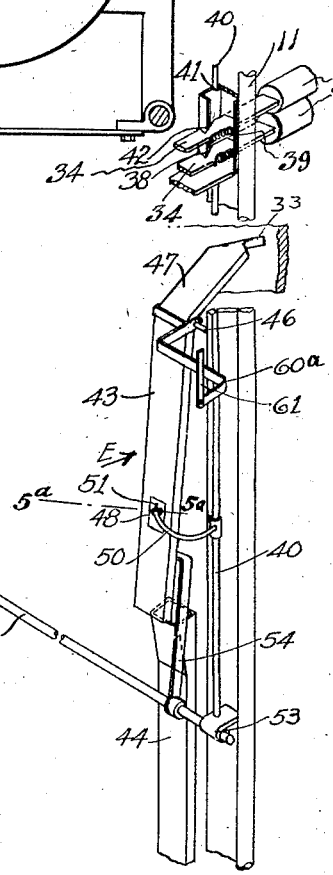

April 2, 1929.  J. L. VAUGHN  1,707,290
AUTOMATIC PHONOGRAPH
Original Filed Sept. 7, 1921   8 Sheets-Sheet 5
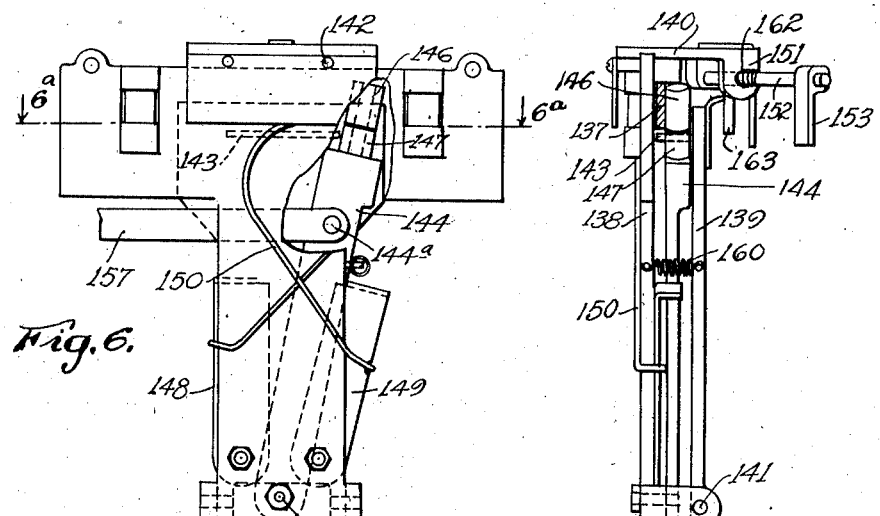

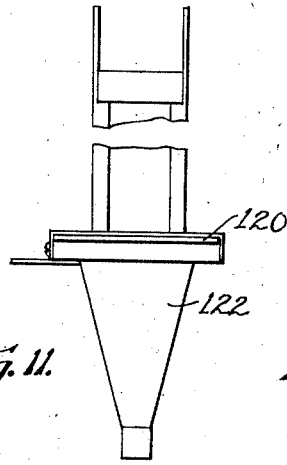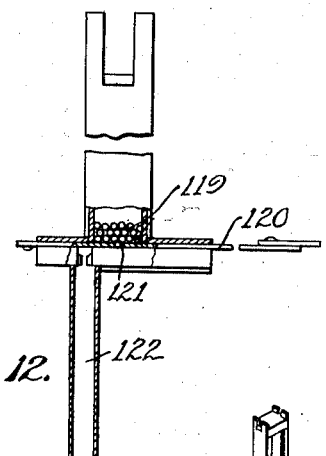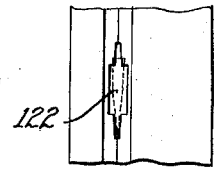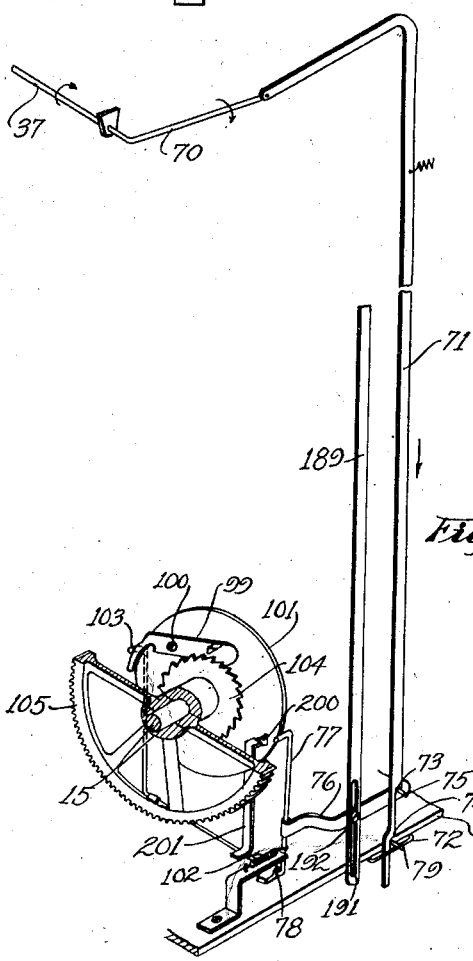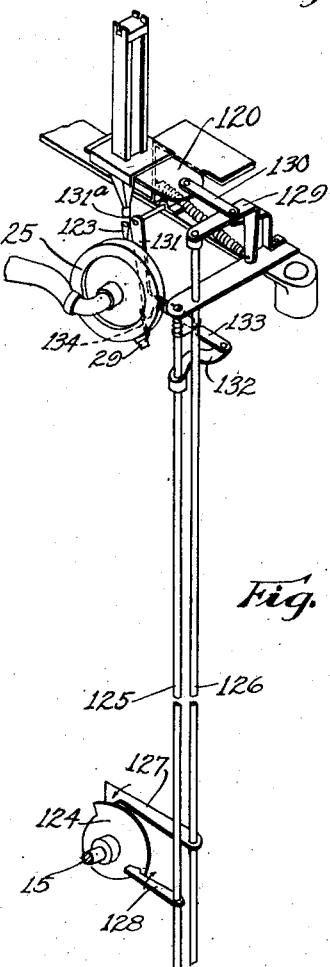

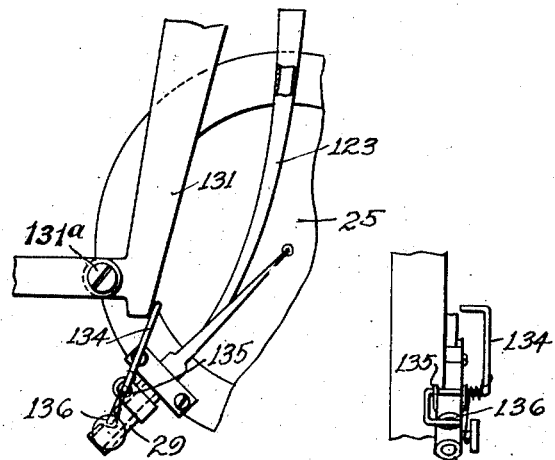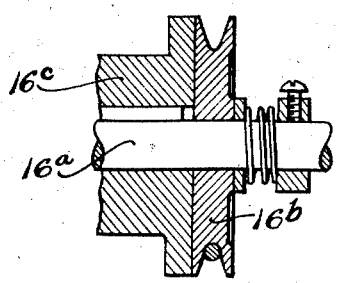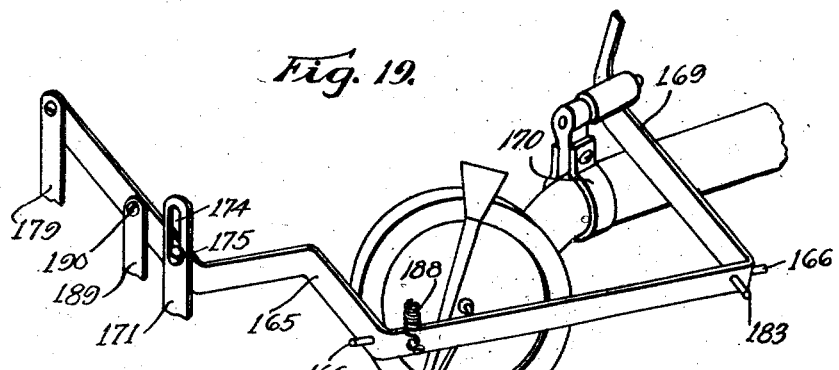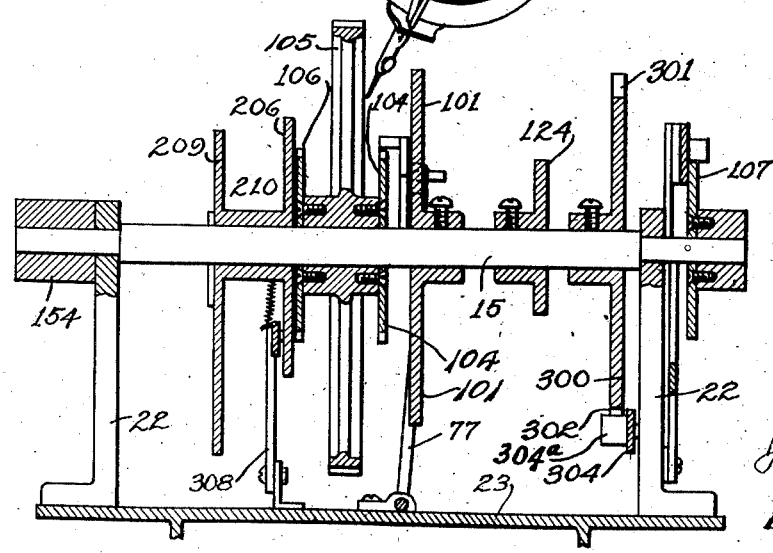

April 2, 1929.    J. L. VAUGHN    1,707,290
AUTOMATIC PHONOGRAPH
Original Filed Sept. 7, 1921    8 Sheets-Sheet 8
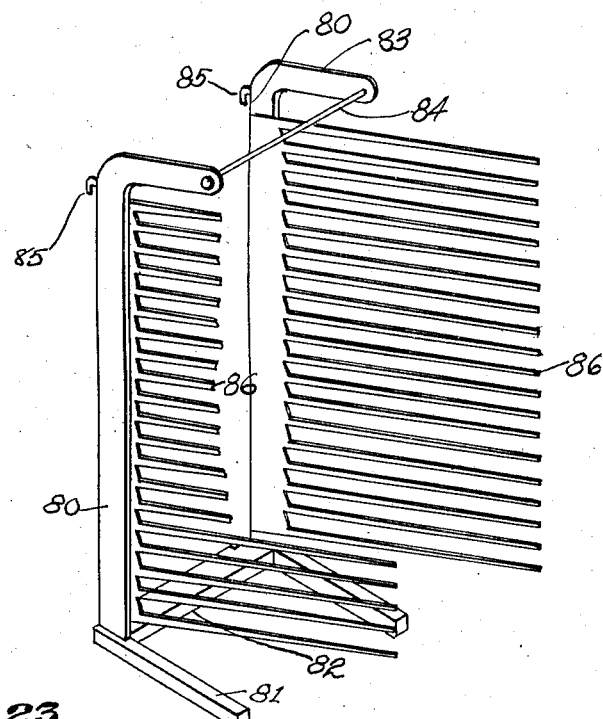
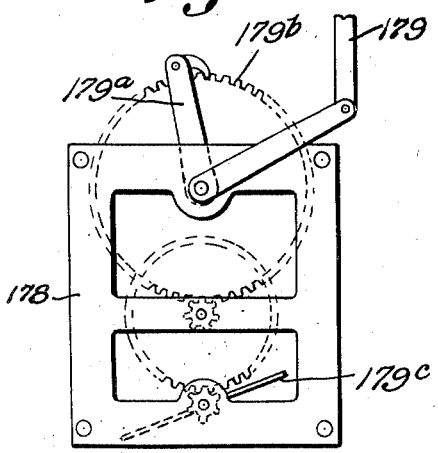
INVENTOR
John L. Vaughn
BY
Chas. E. Townsend
ATTORNEY Patented Apr. 2, 1929.

1,707,290

UNITED STATES PATENT OFFICE.

JOHN L. VAUGHN, OF SAN FRANCISCO, CALIFORNIA, ASSIGNOR TO MARY VAUGHN, OF CICERO, ILLINOIS.

AUTOMATIC PHONOGRAPH.

Application filed September 7, 1921, Serial No. 499,045. Renewed December 31, 1928.

This invention relates to automatic phonographs, and particularly to the coin or token actuated type usually installed in public places to provide amusement.

Phonographs of the above mentioned type or character are generally provided with a magazine containing a suitable number of disk type records, the names of which are visibly indicated in a convenient place on the front of the machine to permit selection of the record to be played. Most machines of this type in use today require a certain amount of skill, strength and dexterity on the part of the operator, and printed instructions are also provided for the guidance of the operator to insure successful operation of the machine.

One of the objects of the present invention is to overcome the objectionable features just mentioned by providing a coin controlled phonograph, which is entirely automatic; the position of the selected record being made after a coin or token has been inserted in the machine by actuating one of a number of buttons or keys located on the exterior of the machine; these buttons or keys agreeing in number with that of the records in the machine, and being identified with the various records by numerals or printed names which are visibly disposed at a point adjacent the keys.

Another object of the invention is to generally improve and simplify machines of the character described so as to require a minimum of attention, such as repairs, adjustments, etc.

Another object of the invention is to provide a machine which is entirely automatic throughout its several operations, which when a coin is deposited will permit selection of a record by merely depressing a button, and which will then automatically select a record in the magazine, transfer the same to the turntable of the phonograph, play the record, replace it, automatically raise and lower the reproducer with relation to the record, and change the needle after each operation.

Another object of the invention is to provide an improved form of record support or magazine, and particularly one which permits the use of double faced records and which may be readily removed as a whole without disturbing any of the remaining mechanism when it is desired to change or turn the records.

Further objects will hereinafter appear.

The invention consists of the parts and the construction, combination and arrangement of parts as hereinafter more fully described and claimed, having reference to the accompanying drawings, in which—

Fig. 2 is a front elevation of the machine showing it removed from the cabinet.

Fig. 3 is a view similar to Fig. 2, but showing the opposite side thereof.

Fig. 4 is a plan section taken on line 4—4, Fig. 2.

Fig. 5 is a fragmentary perspective view of the coin control mechanism and the switch by which the motor circuit is closed.

Figure 1:
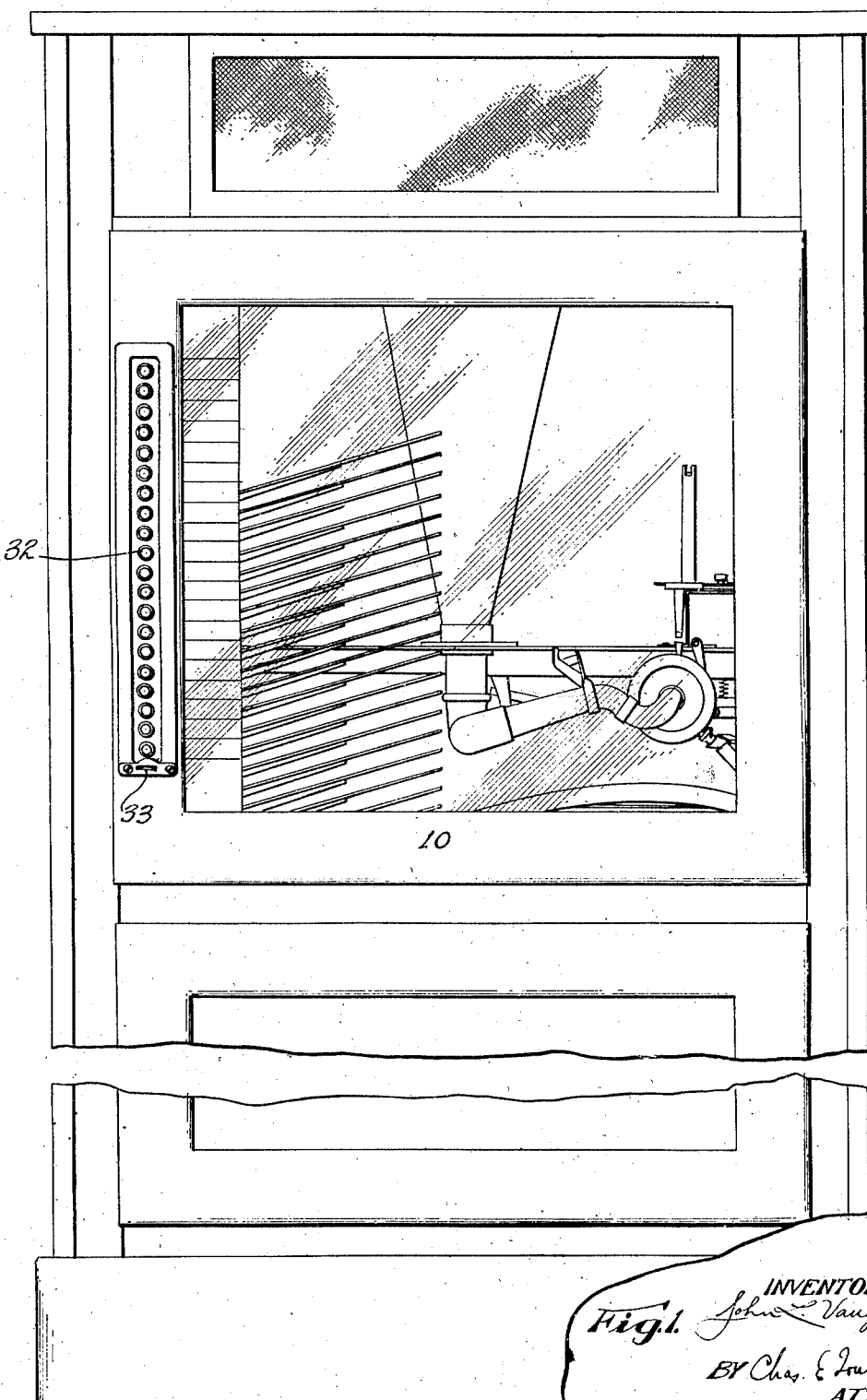
Fig. 1 is a front elevation of the phonograph showing the mechanism enclosed in a cabinet.

Fig. 5$^a$ is an enlarged cross section on line 5$^a$—5$^a$, Fig. 5.

Figs. 6 and 7 are front end elevation respectively of one of the carriers, Fig. 7 being partially in section and partially broken away.

Fig. 6$^a$ is a cross section taken on line 6$^a$—6$^a$, Fig. 6.

Fig. 8 is a detail view showing the magazine controlling and releasing mechanism.

Figs. 9 and 10 are end and front views respectively of the driving mechanism by which the magazine is elevated.

Figs. 11, 12 and 13 are detail views of the needle dispensing mechanism.

Fig. 14 is a detail perspective view of the driving mechanism through which the cam shaft is driven.

Fig. 15 is a detail perspective view of the needle dispensing device and the mechanism actuating the same.

Figs. 16 and 17 are detail views of the reproducer and the needle clamping mechanism.

Fig. 18 is a sectional view through the friction drive by which the turntable is driven.

Fig. 19 is a perspective view of the U-shaped frame whereby the reproducer and tone arm is raised and lowered with relation to the record.

Fig. 20 is a central, longitudinal section of the cam shaft showing the position of the several driving clutches and cams.

Fig. 21 is a perspective view of the magazine, the supporting arms 86 on one side of the magazine being partly broken away.

Fig. 22 is an edge view of the connecting rod 155 and the cam member 164. Fig. 23 is a front view of the fan mechanism.

By referring to the drawings in detail, and particularly to Figs. 1, 2 and 3, it will be seen that disposed within a cabinet 10, of suitable construction, is a main frame, comprising vertical members 11 connected by a top frame 12 and a base section 13. This frame is designed to completely support all of the mechanism comprising the machine so that the frame, together with the mechanism, may be easily removed with relation to the cabinet when making necessary repairs, adjustments or otherwise.

The mechanism in general, for purposes of description, may be divided into the following units: first, a driving motor, 14; second, a cam shaft 15; third, a turntable 16, which is driven from the motor at a reduced rate through the medium of the pulleys 17, 18 and 19; the pulleys 18 and 19 being mounted or secured on a shaft 20, while the pulley 17 is secured on a shaft 21; the shaft 20 being supported in suitable journal members 22 carried by a bracket plate 23, and the shaft 21 in journal members 24 secured to the main base; fourth, a unit of several mechanisms, including a reproducer 25, a tone arm 26, a horn 27, a needle magazine 28, a needle locking mechanism 29, a gauge place 30, and a needle discharging tube 31; fifth, a record holder or magazine as shown at B; sixth, a pair of carriers generally indicated at C, by which the records are transferred from the magazine to the turntable, and conversely returned after the records have been played; there being two carriers C, which are identical in construction, and adapted to operate in unison; and seventh, a coin control mechanism generally indicated at D.

Before proceeding with the detail description of the entire mechanism, it is thought advisable to give a general statement of the several operations which take place. These operation are as follows:

A coin is first deposited in the machine and one, of a number of keys hereinafter to be described, is depressed. Insertion of the coin and depression of the key accomplishes three distinct operations: first, a circuit is closed through the driving motor, and movement is at the same time transmitted to the turntable 16 through the pulleys 17, 18 and 19; said turntable continuing to rotate during the entire operation of the mechanism; second, the record carrying magazine is released and will be lowered by gravity until the selected record reaches the point of removal; third, the lowering of the magazine actuates a mechanism which forms a driving connection between the motor 14 and the cam shaft 15. Three distinct operations will thus take place when the coin is inserted and a selected key is depressed.

The cam shaft makes one revolution during the complete operation of the machine or during the playing of one record. One-half revolution takes place before the record is played. The cam shaft then remains idle during the playing of the record and the final one-half revolution of the shaft takes place during the replacing of the record, and other operations performed in conjunction therewith. During the first one-half revolution of the cam shaft, the following operations take place: first, the gauge plate 30 is swung into position below the needle holder; second, the needle is delivered to the reproducer; third, the needle is locked in the reproducer; fourth, a selected record is removed with relation to the magazine and placed upon the turntable, and fifth, the reproducer is then lowered into engagement with the record. The cam shaft will now come to a stop as its first one-half revolution has been completed and will remain idle until the record has been played. After the record has been played, means actuated by the swinging movement of the tone arm will cause the driving connection between the motor 14 and the cam shaft to be automatically connected, and the remaining one-half revolution of the cam shaft will take place. During this last one-half revolution, the following operations will take place: first, the reproducer will be raised with relation to the record; second, the needle will be released and discharged; third, the record will be removed and replaced in the magazine; fourth, the magazine will be raised to its uppermost position; and fifth, the circuit through the driving motor will be broken.

The several groups of mechanism and the operation of the same will now be described.

The magazine B is in this instance designed to support twenty records and means are provided for selecting any record which it may be desired to play. The magazine consists of a pair of side bars 80, the lower ends of which are turned to form a right angular base section 81, said extensions being connected by a tie or cross bar 82. The upper ends are bent to an angle as shown at 83 and are connected by a rod 84 which serves the function of a handle. Formed on each side bar 80, near the upper end, is a hook shaped lug 85, and secured to each side bar is a plurality of forwardly extending arms 86. The arms are slightly upwardly inclined and are provided for the reception of the records indicated at 87. The hook shaped projections are provided as fastening means for the magazine with relation to a sliding frame now to be described.

The sliding frame, referring to Figs. 2, 3 and 4, consists of a pair of vertically disposed interspaced bars which are T-shaped in cross section as indicated at 88. The lower ends of these bars are connected with a foot plate 89, while the upper ends are connected by a rod 90. Secured to the main frame and connecting the upper section and the base section, is a pair of angle bars 91. These bars serve as a track for the sliding frame, comprising the T bars 88 and the connecting cross bars 89 and 90, and the sliding frame is guided with relation to the angle bars and secured with relation thereto by means of rollers 92 engaging one side thereof and projecting fingers 93 engaging the opposite side of the angle bars. The magazine proper is detachable with relation to the sliding frame to permit it to be removed from the cabinet as will hereinafter be described. The base section, comprising the extensions 81 and the cross bar 82 of the magazine, is received and supported by the cross bar 89 of the sliding frame, while the hook shaped lugs 85 on the magazine engage the upper ends of the T-rails forming the sliding frame, thus securing the magazine when in the machine so that unitary movement of the magazine and the sliding frame will take place. Forming an extension of one of the T-rails of the sliding frame is a bar 68, (Fig. 8) and carried on the upper end of the bar is a latch 67, the function of which will hereinafter be described. The sliding frame, together with the magazine carried thereby, normally assumes an elevated or raised position with relation to the record transferring mechanism hereinafter to be described when the machine is at rest; this position being shown in Fig. 2, and it is released and permitted to lower by gravity when a record is selected for removal. To permit the sliding frame and the magazine carried thereby to settle by gravity; a chain 94 is employed. One end of the chain passes around a pulley or sprocket 96 disposed at the upper end of the main frame and is attached to the upper cross rod 90, see Fig. 4 as at 90$^a$, while the opposite end of the chain is connected with a counterweight generally indicated at 97; said weight being disposed between rods 98 by which it is guided. Means are also provided for raising the sliding frame and the magazine to its elevated position when the playing of a record has been completed, for which mechanism will be later described. The magazine is in the present instance designed to support twenty records and means are provided for selecting any record which it may be desired to play. To accomplish such selection, a similar number of buttons 32 have been provided, see Figs. 1 and 5. These buttons are preferably arranged in row formation on the exterior of the cabinet and agree in number with that of the records in the magazine. A list of names of the records is printed or otherwise indicated on a card; the card being subdivided and having a record named in each division and each division in turn having a number agreeing with that on the aligned button. Therefore, the operator in selecting a record arrives at the name of the desired record. He then inserts a coin or token in the slot 33, and completes the operation by depressing or exerting an inward pressure on the button. The buttons 32 are secured on the outer ends of the keys or bars, as shown at 34, see Figs. 5 and 8, said keys or bars being slidably mounted in the main frame at their outer ends and in a sliding bar 35 disposed at their inner ends. The sliding bar has a slight vertical movement with relation to the main frame which movement is limited by a crank arm 36 secured on a shaft 37, as will hereinafter be described. Each bar 34 is provided with a V-shaped notch 38, see Fig. 5, and each bar, together with the buttons secured thereto, is normally maintained in retracted position by means of a spring 39. The keys or bars are arranged in vertical formation and the notches 38 therefore normally align. Disposed on one side of the bars is a shaft 40. Secured to said shaft is a plate 41, and formed on one edge of the plate is an inwardly turned flange 42 which projects into the notches of the several bars. The coin inserted through the slot 33 enters a coin receiving chute, generally indicated at E, see Fig. 5. This chute consists of a pivotally mounted or swinging section 43 and a stationary section 44, which is connected with a coin receptacle 45. The movable coin chute is pivotally mounted on a rod or shaft 46. The upper end of this chute is bent on an angle, as at 47, and the mouth thereof registers with the coin slot 33 when the machine is not in operation. Formed adjacent the lower end of the chute 43 is a pair of aligned openings 48 and 49 (Fig. 5$^a$). These openings are formed in opposite sides of the chute and are provided for the reception of an arm 50 which is secured to the shaft 40 and turns in unison therewith. The arm 50, or the end projecting through the openings 48 and 49, serves as a temporary stop member for the coin inserted, that is the chute 43 and the arm 50 normally assume the position shown in Figs. 5 and 5$^a$. A coin inserted will therefore rest on the end of the arm and will be temporarily held against further travel through the chute. As previously stated, when it is desired to select and play a record, it is first necessary to insert a coin and then to depress the selected key. Depression of the key causes the notch 38 thereof to engage the inwardly projecting flange 42 of the plate 41. The notch thus serves as a cam and imparts a turning movement to the shaft 40. This turning movement causes the arm 50 to swing inwardly through the openings 48 and 49 in the chute, but as the coin has already been deposited in the chute and rests upon the arm, it is obvious that a rocking movement will be transmitted to the chute 43 about the shaft 46. This rocking movement is transmitted due to the fact that a finger 51 is secured on the arm. This finger engages one side of the coin and forces it against the opposite wall of the chute. The tilting movement imparted to the chute is transmitted to a shaft 52 which is suitably journalled within the frame as indicated at 53. Secured on an adjacent end of the shaft is an arm 54 which is connected with the rear side of the coin chute 43 by means of a spring 55, see Fig. 2, and secured to the opposite end of the shaft is an arm 56, which serves the function of actuating the main switch F through which the circuit through the driving motor 14 is closed. The switch is of the knife or blade type and consists of a blade 57 pivoted as at 58. The circuit is connected with one end of the blade and the opposite side of the circuit passes through a contact 59 with which the blade engages when the switch is closed. Secured to the inner end of the blade or forming a right angular extension thereof is an upwardly extending arm 60. This arm is adapted to be engaged by the member 56 and when said member is rocked, it is obvious that the switch will be closed.

As previously stated, the coin control mechanism serves three functions, first that of closing the circuit through the motor 14. The mechanism employed for this purpose has just been described. The second function of the coin control mechanism is that of releasing the magazine in which the records are supported so that the magazine may settle by gravity until the selected record reaches the point of removal. This is accomplished by the following mechanism: Secured on the rod or shaft 46 is a crank arm 60ª, and connected with said crank arm is a link or rod 61, the upper end of which is connected with a crank arm 62 secured on a shaft 63. (See Fig. 8.) Also secured on said shaft is a latch member 64 which engages a fan 65. This fan is driven through a gear train 66 which is operatively connected with the magazine supporting mechanism hereinafter to be described, that is release of the fan permits the magazine to settle by gravity until the selected record reaches the point of removal and the speed with which the magazine is lowered is regulated by the fan.

It is here stopped by a latch 67 carried by an extension 68 formed on a frame by which the magazine is supported. The second function of the coin control mechanism is therefore that of releasing the magazine through means of the mechanism just described, and the third function of the coin control mechanism is that of forming a driving connection between the motor and the cam shaft 15, which is accomplished as follows: Depression of a key, for instance that shown at 34, in Fig. 8, causes it to assume the dotted line position shown at 34ª. Assuming this position it can readily be seen that the latch 67 will engage the key and thus stop further downward movement of the magazine. The bar 35 supporting the inner ends of the keys however has a slight vertical sliding movement as previously stated which is limited by the crank arm 36. This sliding movement takes place when the latch engages the key and it thereby imparts a rocking movement to the crank arm and the shaft 37. Forming a part of the other end of the shaft 37 is a crank arm 70, (see Fig. 14) and connected with said crank arm is a vertically disposed bar 71, the lower end of which is guided by means of a strap 72 secured on the bracket 23. The lower end of the bar 71 has a shoulder 73 formed thereon and a cam portion 74. The shoulder 73 engages a pin 75 secured on an arm 76, which in turn is carried by a detent member 77 extending under the cam shaft and journalled on the bracket as at 78, while the offset or cam portion 74 engages a stationary pin 79.

The shoulder 73 and the cam 74 operate, practically speaking, in unison, that is during the downward movement of the bar 71 engagement is simultaneously made with the pins 75 and 79. The arm 76 carried by the detents 77 will thus impart a rocking movement to the detents and release the same momentarily with relation to a pawl 99 which is pivotally mounted as at 100 on a disk 101 keyed or otherwise secured on the cam shaft 15. Simultaneous with the rocking movement which is imparted to the detents 77, cam 74 engages the stationary pin 79 and a side or swinging movement is thereby transmitted to the bar 71 causing the shoulder 73 to become disengaged with relation to the pin 75. The moment this disengagement has been accomplished, detents 77 are restored to normal vertical position due to the pull exerted by a spring 102. During the momentary rocking movement of the detents, pawl 99 is released as a finger 103 engaged by one of the detent arms was released and it thus permitted the dog on the pawl to drop downwardly into engagement with a ratchet wheel 104, which is freely turnable on the cam shaft in unison with a spur gear 105. It may here be stated that the spur gear 105, the ratchet wheel 104, and a similar ratchet wheel 106 (Fig. 20), are freely turnable on the cam shaft as shown in Fig. 20, and are continuously rotated when a circuit is closed through the driving motor 14, but the cam shaft is only intermittently rotated; the first one-half revolution being imparted to the cam shaft when the latch 99 drops into engagement with the ratchet wheel 104, and the second one-half revolution when a similar driving connection is formed through the opposite ratchet wheel 106 as will hereinafter be described. The spur gear 105 is driven by the motor through means of the pulleys 18, and 17, and a pinion secured on the shaft 20. The third operation, to-wit, that of forming a driving connection between the motor 14 and the cam shaft has now been described, and the several operations taking place during the one-half revolution of the cam shaft will now be described:

First, it is necessary to swing the gauge plate 30 into alignment with the needle holder carried by the reproducer, 25. This is accomplished by means of a cam 107 (Fig. 3) secured on the cam shaft. Pivotally mounted, as at 108, below the cam shaft, is a fork shaped lever consisting of a shaft arm 109 and a longer upwardly extending curved arm 110. The extreme end of this arm is forked, as at 111, and straddles a crank arm 112 on a needle discharging tube 31. This tube consists of an upper section 113 and a lower section 114, the upper section being turnably mounted in bearing members 115. The upper end of the tube 113 is bent, as at 116, to align with the needle holder on the reproducer, and it also serves as a support for the gauge plate 30. Formed near the lower end of the fork shaped arm 110 is a lug 117, and secured on one side of the cam 107 is a pin 118. This pin engages the lug 117, which is cam shaped, during the first part of the one-half revolution of the cam shaft, and the cam 107 thereby imparts a rocking movement to the arm 110 about the pivot 108. This rocking movement is in turn transmitted through the fork 111 and the arm 112 which is secured to the upper section 113 of the needle discharge tube, thus turning the same a sufficient distance to swing the gauge plate into alignment with the lower end of the needle holder. Following this operation, a needle is removed from the magazine 28 and deposited in the needle holder, after which the needle is clamped in the holder. This is accomplished as follows:

The needle magazine, illustrated in Figs. 11, 12, 13 and 15, contains a suitable number of needles as indicated at 119. Forming a bottom for the magazine is a sliding plate 120 in which is formed a slot 121 said slot having an area just sufficiently large to receive a single needle. The slide plate is moved from the position shown in Fig. 12 until the slot 121 therein aligns with a discharge chute 122. The needle is thus released from the slot in the sliding plate and falls by gravity through the chute 122 into a secondary chute or tube 123 secured on the side of the reproducer. This tube directs the needle directly into the holder 29 where it is locked; the needle being prevented from dropping out of the holder before the locking thereof by the gauge plate, said gauge plate forming a second function, that of determining the distance the needle projects from the holder. To automatically impart a sliding movement to the plate 121, which releases the needles one by one with relation to the magazine, and similarly to provide means for automatically locking the needle in the holder 29, the following mechanism is employed:

Secured on the shaft 15 is a cam 124. Disposed in front thereof is a pair of shafts 125 and 126, Fig. 15. Secured on the lower end of the shaft 126 is an arm 127, and similarly secured on the shaft 125 is an arm 128. These arms engage opposite sides of the cam 124 and cooperate with said cam to impart a turning movement to the respective shafts 125 and 126. Turning movement imparted to shaft 126 is transmitted to the sliding plate 120 by means of a crank arm 129 and a link 130, while turning movement imparted to shaft 125 is transmitted to an arm 131 by means of a crank arm 132 secured on the upper end of shaft 125 and a link 133. The needle locking mechanism consists of a spring actuated lever 134, (see Fig. 16) pivotally mounted, as at 135, on the needle holder. One end of the lever enters the notch of the needle holder, as at 136, where it exerts a clamping action on the needle, while the opposite end of the lever is adapted to be engaged by the arm 131. When engaged by said arm, the locking lever 134 is swung to release the needle, while if arm 131 is swung out of engagement with the locking lever, the spring carried by the locking lever will swing the same into locking position, thus securing the needle. This is accomplished when the first movement is transmitted to shaft 125, that is it is turned in such a direction that lever 131, which is pivotally supported as at 131$^a$, will swing away from the locking lever and permit the needle to be clamped or secured.

The mechanism which actuates or swings the gauge plate in position has been described, as has also the mechanism which actuates the needle magazine and secures the needle in the holder. These three separate groups of mechanism are actuated during the first one-half revolution of the cam shaft and as previously stated, a selected record is transferred from the magazine and placed upon the turntable and the reproducer is finally lowered into engagement with the record; the two last operations also taking place during the first one-half revolution of the cam shaft.

To clearly understand the operation of the record transferring mechanism, a detail description of the carriers which perform this operation will follow:

There are two carriers employed for the purpose of transferring the records from the magazine to the turntable and conversely for returning the records from the turntable to the magazine. The carriers are generally indicated at C. There are two employed and disposed one on each side of the main frame; each carrier being supported by a pair of interspaced tracks such as indicated at 137. The carriers are identical in construction and the description of one is thought sufficient. By referring to Figs. 6 and 7, it will be seen that each carrier consists of a pair of side plates 138 and 139, and a top plate 140. The inner side plate 139 is pivotally supported with relation of the plate 138, as at 141, and the upper plate is secured to the plate 138, as indicated at 142. It may therefore be stated that the plate 138 is a support for the plates 139 and 140. By referring to Fig. 7, it will be seen that the upper end of the plate 139 passes below the top plate 140, and that it has a swinging movement with relation thereto; further that it assumes a normal position with relation to the plate 138, which is parallel therewith as shown in this figure.

To impart a tilting movement, a cam 143 has been provided. This cam is V-shaped and is secured to the upper end of the plate 139. Disposed between the plates 138 and 139 is an arm 144. This arm is pivotally secured to the plate 138 at its lower end as shown at 145. The upper end of the arm is provided with two rollers as indicated at 146 and 147. The upper roller forms the function of a guide for the arm, while the lower roller engages the cam member 143. Also pivotally secured to the end of the plate 138 is a pair of arms 148 and 149. These arms alternately assume a vertical position and a tilting position as shown in Fig. 6. Both arms alternately engage the arm 144, and both of arms 148 and 149 are connected by a spring 150. Journalled on the lower side of the top plate 140, in bearing lugs such as shown at 151, is a pair of arms 152, (see Figs. 4 and 7). These arms are horizontally positioned, but angularly disposed with relation to the tracks 137 and the carriages guided thereby. Secured on the outer end of each arm 152 is a finger 153. These fingers normally assume a vertical position such as illustrated in Fig. 7, but they are raised to a horizontal position to engage and lift a record with relation to the magazine when a swinging movement is imparted to the plates 139 of the respective carriages. This swinging movement is transmitted from the cam shaft through means of a crank arm 154, a link 155, a pair of main actuating arms 156, and a pair of links 157; there being two links 157, one for each carriage, two main actuating arms 156, one disposed on each side of the frame and guided by the lower track 137, and only one link 155 and crank arm 154. That is, the main actuating arms 156 are pivotally connected as at 158 with the link 155, this being of importance as it insures unitary movement of the main actuating arms 156 and the cooperating carriages. The main actuating arms 156 are pivotally supported with relation to the main base as shown at 159. They swing from the position shown in Fig. 2 to an approximate alignment with the turntable when a record is transferred from the magazine to the turntable; this swinging movement taking place during the first one-half revolution of the cam shaft. The first movement of the arms 156 exerts a pull on the links 157 and as these are attached to the upper ends of the arms 144, as shown at 144ª, a rocking movement is transmitted to the arms 144 and the rollers 147 will thus engage the cams 143 and force the plates 139 inwardly against the tension of the springs 160. The rollers 147, or the arms 144, swing until the apex of the V-shaped cams 143 is reached. Further swinging movement is stopped when this position is reached as the arms 149 follow the arms 144 and permit the spring 150 to assume a balanced position. In other words, the arms 144 are temporarily locked when they assume a vertical position, and further movement of the main actuating arms 156, through means of the links 157, will then move the carriages from alignment with the magazine to approximate alignment with the turntable. During the movement of the arms 144, from the angular position shown in Figs. 6 and 7, to the central vertical position just described, movement is also imparted to the arms 152 and the fingers 153 carried thereby, which previously assume the vertical position, have now been swung to a horizontal position. During this swinging movement the selected record is engaged and lifted with relation to the arms 86 supporting the same, and during the movement of the carriages from the magazine to the turntable, it is obvious that the record will be supported by the fingers and will not be released until the turntable is reached. This release is accomplished by again swinging the arms 152 to a position where the fingers assume a vertical position and this is accomplished by a pair of stop members 161 secured at the opposite ends of the upper rails or tracks 137. These stop members are engaged by the ends 162 of the respective carriages. The swinging movement of the main actuating arms 156 has however not been completed when engagement is made with the stop members and a further pull will thus be exerted on the links 157. The carriers however have come to a stop and can move no further, so it is therefore apparent that the arms 144 will be swung to a tilted position opposite to that shown in Fig. 6. Rollers 147 will thus ride off the cams 143; the plates 139 will swing back to parallel position as shown in Fig. 7, and arms 152, together with the fingers 153 carried thereby, will take to normal position through the medium of springs 162, which were previously placed under tension when the fingers were swung to horizontal position. It should be understood that turning movement is imparted to the arms 152 in unison by engagement of the upper end of the plate 139 with projecting fingers 163 secured on the inner ends of the arms.

The foregoing specification describes the construction of the carriers, the means whereby they are actuated, the means for transferring the records from the magazine to the turntable, and for releasing them after the transfer.

There are two additional operations which take place before the cam shaft 15 comes to rest when completing the first one-half revolution. The coin deposited in the chute and retained by the curved arm 50 is released and the reproducer is finally lowered into engagement with the record to permit playing thereof. The releasing of the coin and the transfer of the same to the coin receptacle 45 takes place just as a record is being deposited on the turntable. This is accomplished by means of the following mechanism:

Secured on the connecting rod or arm 155 (Fig. 2), that is on one side thereof, is a projecting cam member 164. This cam engages the arm 56, (see Figs. 2 and 5) when the crank 154 is just about to reach the position assumed after the first one-half revolution. Engagement of the cam 164 with the arm 56 imparts further movement to the same in the direction of the arrow. (See Fig. 5.) Arm 54, which is connected with the lower end of the pivotal chute section 43, will thus swing the lower end thereof into alignment with the stationary section of the chute 44 and away from the end of the curved arm 50; a coin being thus released and permitted to drop by gravity into the chute 44 which delivers it to the coin receptacle 163.

The tone arm, together with the reproducer, will now be lowered into engagement with the record already deposited on the turntable and this is accomplished by means of the following mechanism:

Referring to Figs. 3 and 19, a frame 165 is indicated. This frame is U-shaped and is pivotally mounted, as at 166, between a pair of bearing lugs 167 secured to a transverse bar 168 carried by the main frame. One arm of the U-shaped frame or that indicated at 169, is curved to engage a hanger or bracket 170 secured to the tone arm. (See Fig. 2.) The frame serves the function of raising and lowering the tone arm, together with the reproducer, with relation to the record and the turntable. This is accomplished by tilting the frame about the pivotal connection 166, the means employed being the cam 107, (Referring again to Fig. 3.) a link 171, and a lever 172, which is pivotally mounted as at 173. The upper end of the link 171 is slotted, as at 174 (Fig. 19), and straddles a pin 175 secured to one arm of the U-shaped frame. The function of this slot will hereinafter be described. Secured on one side of the arm 172 is a pin 176, and formed on the periphery of the cam 107 is a cam shaped recess 177 which moves into alignment with the pin 176 when the first one-half revolution of the cam shaft is being completed. The pin drops off the abrupt shoulder of the notch 177 when this position is reached, thereby permitting lever 172 and link 171 to drop by gravity a sufficient distance to allow the tone arm and the reproducer to settle downwardly into engagement with the record. The drop of the lever 172 and the link 171 is almost instantaneous and such instantaneous movement is permitted by the slot 174 in the upper end of the link. The U-shaped frame or the arm 169 formed thereon however swings slowly in a downward direction about the pivots 166 as the movement is resisted or cushioned by a fan mechanism generally indicated at 178. A link 179 is connected with the fan mechanism 178 and serves as a support for the U-frame during its lowering movement. The fan mechanism operates as follows: link 179 is connected to a ratchet lever 179$^a$ which engages the teeth of a gear 179$^b$. This gear, which operates through a train of gears, as clearly illustrated in Fig. 1 of the drawings, rotates the fan 179$^c$. The link 179 is connected with the arm 169 which, in turn, is engaged by the roller of the tone arm. When the tone arm is lowered, the roller engages the arm 169 and imparts a rocking movement thereto. This downward movement is transmitted through the link 179 to operate the gear frame and the fan driven thereby, and the fan, accordingly, retards or regulates the downward movement of the tone arm to the record. With the reproducer lowered to engagement with the record, it is necessary to stop further revolution of the cam shaft as the entire mechanism must remain idle during the playing of the record, and means must be provided for automatically establishing a driving connection when the playing of the record is completed so that the record may be returned and the mechanism in general restored to normal inactive position. The breaking of the driving connection between the motor and the cam shaft is automatically accomplished when the reproducer has been lowered into engagement with the record, or simultaneous with said engagement by means of the detent arm 77, (see Fig. 14), that is the disk 101, which is keyed or otherwise secured to the cam shaft and which operates the pawl 99, has during the first one half revolution of the cam shaft turned to a position where the finger 103 will engage the opposite detent 77. Such engagement with the detent will raise the pawl out of engagement with the ratchet wheel 104, and the driving connection between the motor and the cam shaft is thus temporarily interrupted or broken. This connection will not be established again until the playing of the record has been completed and it is then automatically re-established by the following mechanism:

Again referring to Fig. 3, it will be seen that an arm 180 is pivotally mounted, as at 181, on one side of the frame which actuates the lowering and raising of the tone arm and the reproducer. One end of the arm 180 is fork shaped, as at 182, to permit it to straddle a pin 183, (see also Fig. 19) which is secured to the frame 165. Also pivotally supported at one end by the frame, as at 184, is an arm 185. The lower end of this arm is shouldered, as at 186, and forms a temporary support for the free end of the arm 180, which is bent at right angles to engage the shoulder 186. The arm 180, or the hook shaped end thereof, is swung into engagement with the shoulder when the frame is rocked to lower the tone arm and the reproducer into engagement with the record, but a further swinging movement of the frame is imparted when the playing of the record is completed. This movement is only slight and is imparted by a pin 187 secured on the inner end of the tone arm. This pin will during the last horizontal swinging movement of the tone arm engage the lower end of the lever 185, thus releasing arm 180 with relation to the shoulder 186 and permitting the arm 180 to drop further in a downward direction, said dropping or lowering movement being also imparted to the frame by means of a spring 188. This additional swinging or rocking movement imparted to the frame is transmitted through a link 189 which is pivotally secured at its upper end to the frame as indicated at 190. Its lower end is slotted, as shown at 191 (Fig. 14), and it straddles a pin 192, secured on the extension 76 of the detent 77. During the first lowering movement of the frame which took place when the tone arm and reproducer were lowered into engagement with the record, link 189 travelled freely with relation to the pin 192, due to the slot 191 formed in its lower end. The upper end of the slot was however reached during this first movement and the secondary movement imparted thereto when engagement was made between the pin 187 and the lever 186. While very slight, it is just sufficient to rock the detent 77, thereby releasing the finger 103 and permitting the pawl 99 to again engage the driving ratchet 104. The driving connection between the motor and the cam shaft is again thus automatically established and the mechanism as a whole is again set into operation. The second or the last one-half revolution of the cam shaft now takes place.

The first operation performed is that of raising the tone arm and the reproducer with relation to the record and the turntable. This is accomplished by a continued movement of the cam disk 107. (See Fig. 3.) The cam notch 177 will first engage the pin 176 and thus impart an upward movement to the lever 172 and the link 171. This link will similarly impart an upward rocking movement to the frame 165 about the pivotal mounting 166, and the arm 169 will thus engage the bracket on the tone arm and raise the tone arm and the reproducer in unison. Simultaneous with this movement, or practically speaking, following the same, three other results are accomplished: First, the needle discharging tube or the upper portion thereof is turned back to normal position where the upper mouth will align with the needle holder; second, the needle will be released and permitted to discharge, and third, movement will be imparted to the carriers, first to raise the record with relation to the turntable, and secondly to transfer the same to the magazine. Turning movement is imparted to the needle discharging or receiving tube, or the upper section 113, (Fig. 3), by means of the arm 110, that is the pin 118 on the cam disk 107 will during the turning movement of the disk engage the lower fork shaped extension 109. This engagement will cause arm 110 to rock about the pivotal mounting 108 and as the fork shaped upper end 111 of the arm 110 engages the crank arm 112, turning movement will be imparted to the tube 113 and the mouth or upper end 116 will thus be swung into register with the needle holder. As just stated the needle is then released and permitted to discharge. This is accomplished by engagement of the clamping lever 134 (Figs. 15 and 16) with the arm 131. Such engagement causes the clamping lever 134 to swing about the pivot 135 and its lower end to move outwardly with relation to the notch 130. The needle is thus released and will drop directly into the mouth of the tube 113, through which and the tube 114 it drops by gravity, being finally deposited in the receptacle 195 provided for the reception of the used needle. A moment previous to the releasing of the needle, it might be stated that cam disk 124, shown in Fig. 15, which is also secured on the cam shaft, turns to a position where it imparts a reverse rocking movement to the arms 127 and 128. Shafts 125 and 126 are thus turned in a reverse direction from that imparted during the first one-half revolution of the cam shaft; arm 131 is thus swung back into position where it will engage and release the needle clamping lever 134 when the reproducer is raised, and the slide plate 120 is similarly returned into alignment with the magazine where it will receive a new needle.

The mechanism for lifting the record with relation to the turntable, or transferring it to the turntable from the magazine, and for depositing the record in the magazine, now comes into action, due to the swinging movement of the crank arm 154 which is secured to the cam shaft, that is the first movement of the main actuating arms 156 will cause the arms 144 (Fig. 6) on the respective carriers to assume a vertical position, or in other words engage the apex of the cams 143. This movement is transmitted to the arms 152 and the fingers 153, which then assume a horizontal position, causing the record to be engaged and lifted with relation to the turntable. Continued movement of the main actuating arm will next cause the carriers to move from the turntable towards the magazine, this movement being finally limited by the stop members 161ª. The main actuating arms however continue their movement a slight distance, and this is sufficient to swing the arms 144 to assume a tilted position opposite to that shown in Figs. 6 and 7. In other words, the rollers 147 are swung out of engagement with the cams 143; the plate 139 is permitted to assume a vertical position, and the arms are returned to normal position; turning the fingers 153 to the vertical position shown in Fig. 7, thus releasing the record and permitting it to be supported by the arms of the magazine. This last operation, that of releasing the record and depositing it upon the arms in the magazine, takes place just as the last one-half revolution of the cam shaft is being completed. At this very moment a lug 200, secured on the driving disk 101, engages the upper end of an arm 201. (See Figs. 9 and 14.) Arm 201 forms a part of a tripping bar 202, which is pivotally supported below the main driving gear 105, as at 203. The tripping bar is rocked in the direction of the arrow, (see Fig. 9,) when lug 200 engages the upper end of the arm 201. A latch 204 (Fig. 10) pivotally mounted as at 205, on a disk 206, similar to disk 101, inasmuch as it is turnably mounted on the cam shaft, is released when the tripping bar 202 is rocked and a driving connection is thus formed between the disk 206 and the driving ratchet 106, (see Figs. 9 and 10). The cam shaft now comes to a rest as the finger 103 on latch 99 will engage the detent 77, thus raising the pawl out of driving engagement with the driving ratchet 104. The second driving connection established just previous to the disconnection of the drive provided for the cam shaft, to-wit, the driving ratchet 104, the pawl 99 and the disk 101, is employed for the purpose of actuating a lifting arm 208 through which movement is transmitted to elevate the magazine and the sliding frame in which it is supported. This mechanism comprises a cam 209, (see Figs. 5, 9 and 20), which is secured with relation to the driving disk 206 by means of a hub or bushing connection 210. The lifting arm 208 is pivotally supported, (see Fig. 5), in a bearing member 211. One end of the lifting arm is provided with an extending pin and a roller 212, which is adapted to be engaged by the cam 209. The opposite end of the lifting arm is connected with the sliding frame through means of a link 213. The low end of cam 209 engages the roller 212 during the first part of its revolution, and a continued revolution as the higher portion of the cam engages the roller will therefore impart a rocking movement to the lifting arm 208 about the pivotal support 211, thus imparting a vertical movement to the outer end, the link 213, the sliding frame and the magazine supported thereby; the magazine being finally elevated to its normal rest position when the high point of the cam is reached. The driving connection between the motor and the disk 206 is then broken, and the whole machine will come to rest as the circuit through the motor is also broken. The driving connection is automatically disconnected when the cam 209 has completed one revolution by engagement of a finger 215 formed on the pawl with the upper end of the tripping bar 202. When the finger engages the upper end of said bar, a rocking movement is imparted to the latch and the driving connection between the ratchet 106 and the pawl is thus broken. During the upward movement of the carriage, several parts of the mechanism are automatically restored to normal position. The first part of the mechanism to be restored is the key which is originally selected and depressed. The moment the sliding frame and magazine start upward movement, it can readily be seen that latch 67 will move away from the key 34ª, (see Fig. 8) thus relieving the same of pressure. The key will automatically snap back to retracted position, due to the springs surrounding the same, and the sliding plate 35 will be restored to normal raised position by means of the spring 35ª. A rocking movement will thus be transmitted to the arm 36 and the shaft 37. This rocking movement will be transmitted through the connection 70 to the bar 71, and this will be raised to normal position, where the shoulder 73 and the cam 74 will be shifted back to engagement with their respective pins 75 and 79.

The plate 41 secured on shaft 40, which is part of the coin control mechanism shown in Fig. 5, will also return to normal position as the inturned edge 42 of plate 41 will swing inwardly and engage the bottom of the notches 38, as these align the moment the depressed key returns to retracted position. This turning movement of shaft 40 swings the curved arm 50 back, thus permitting the chute to follow and assume normal position where it is ready for the reception of a new coin. This mechanism is thus automatically restored.

A pin 216, secured on one side of the cam 209, (also referring to Fig. 5) will, when the carriage has reached its uppermost position, engage a bell crank 217 which is pivotally mounted, as at 218, on the side of the bearing bracket 211. The opposite end of the bell crank is connected with a switch latch 219, which is pivotally mounted as at 220. This switch latch is raised and a spring 221 connected with the lower end of the switch arm will then exert its pull and open the switch, thus breaking the circuit through the motor. During the opening movement of the switch, the extension 60 formed thereon, will engage the arm 56 and impart a reverse swinging movement to shaft 52. This movement will be transmitted through arm 54, which is connected with the rear side of the chute section 43, thus returning this to normal position. The swinging movement imparted to the chute will actuate the lever 60ª and an upward movement will be imparted to the link 61, (see Figs. 5 and 8), thus imparting a rocking movement to the crank arm 62, the shaft 63 and the latch 64. This causes the latch to engage the fan 65 and the final operation is completed as the sliding frame and the magazine supported thereby have been elevated and are locked in the elevated position, the moment the latch engages the fan.

During the operation of the machine, it is obvious that it is essential to provide means for aligning the several cams carried by the shaft 15, or in other words to stop the shaft at a predetermined point when its one revolution has been completed, so as to maintain a synchronism of action received between the several groups of elements. To accomplish this a pair of aligning disks has been provided, one disk being indicated at 300, and the other at 206. (See Fig. 20.) The disk 300 is circular in formation and has two notches 301 and 302 formed in its periphery, and directly opposite each other. Mounted below the disk is a lever 304 actuated by a spring 304ᵇ (see Fig. 3), and carried by the lever is a pin 304ª which engages the periphery of the disk and it is therefore in position to enter the notches 301 and 302. The notch 301 positions the shaft or stops further revolution thereof when its first one-half revolution has been completed, and the notch 302 positions the shaft when the second one-half revolution is completed. The disk 206, which carries the pawl 204, (see Fig. 10) merely serves the function of positioning the cam 209. This cam is employed for the purpose of raising the magazine after the record has been replaced, and a spring actuated lever 308 having a pin at its upper end engages the notch in the disk 206, (see Fig. 10) and thereby stops its revolution when the several operations of the entire mechanism have been completed. The disks 206 and 300 may therefore be termed aligning or positioning disks as they stop the shafts and cams at predetermined points to insure successive or synchronous action of the mechanism.

In Fig. 18, a form of friction drive is shown. This is employed in connection with the turntable and permits the governor of the turntable to increase or decrease the speed of the turntable independently of the continuous speed of the electric motor through which it is driven. By referring to Fig. 2 it will be noted that the turn-table is mounted on a shaft as indicated at 16ª. A pulley 16ᵇ is loosely mounted on the shaft as illustrated in Fig. 18, but it is held in frictional engagement with a driving collar 16ᶜ by means of a spring, the pulley 16ᵇ being driven from pulley 19 by means of a belt, as shown in Fig. 2. The speed of the turn-table and the shaft, whereby it is driven, is controlled by means of a governor mechanism generally indicated at 16ᵈ, this governor serving the function of increasing or decreasing the speed of the turn-table independently of the continuous speed of the electric motor 14 through which it is driven.

From the foregoing description, it will be remembered that the magazine in which the several records are supported is detachably supported with relation to the sliding frame; the detachable connection being formed by the hooks 85 and the base section or cross bar 82. The detachable connection is made for the purpose of permitting ready removal or insertion of a filled magazine whenever desired. For this reason I prefer a hinge cover for the cabinet and a suitable locking means. Therefore, if it is desired to change the records or turn the same, it will only be necessary to raise the cover and remove the magazine by grasping the cross rod 84, which then serves as a handle. An upward pull will release the magazine with relation to the sliding frame supporting the same. The magazine can thus be lifted out of the machine and the records changed or turned as may be desired. This is an important feature as machines of the character described are generally placed in public places to provide amusement. It is therefore essential that the records be changed from time to time and such change should be quickly and readily accomplished as one caretaker may have a considerable number of machines under his observation and care. As far as the general public is concerned or any one desiring to play the machine, it is obvious that neither strength, dexterity nor skill is required to successfully operate the same as it is only necessary to insert a coin in the slot 33 and then depress one of the buttons 32, or that which aligns with the name of the record desired to play; the name being displayed on the printed list disposed on one side of the keys as shown in Fig. 1. The moment a coin has been inserted and a key depressed, further care or attention on the part of the player will not be required as the several groups of mechanism contained in the machine will then begin to automatically function. The circuit through the motor will first be closed, the magazine will be lowered until the selected record aligns with the carriers, the record will be transferred to the turntable, a new needle will be placed in the holder of the reproducer and clamped, the reproducer will be lowered to the record, the record will then be played while the entire mechanism remains stationary, and the mechanism will again be automatically started when the record has been completed, due to the automatic driving connection established during the last portion of the horizontal swinging movement of the tone arm. The reproducer will then be raised, the record replaced in the magazine, the needle discharged, the several groups of mechanisms will be restored to normal position, the magazine will be lowered to its normal position and the switch controlling the motor circuit will finally be opened, thus completing the entire operation.

Having thus described my invention, what I claim and desire to secure by Letters Patent is—

1. In a device of the character described, a magazine supporting a plurality of records, means whereby the magazine may be raised by power and lowered by gravity, a turntable, a record transferring mechanism, a plurality of depressible keys, one for each record in the magazine, said keys serving the function of releasing the magazine for downward gravitational movement and selecting the record to be played, and means actuated by depression of the key for positioning the selected record with relation to the transferring mechanism.

2. In a device of the character described, a record magazine support, comprising a sliding frame, a record carrying magazine carried thereby, means for maintaining the sliding frame and the magazine supported thereby in a normal elevated position, a plurality of depressible keys one for each record in the magazine, said keys serving the function of selecting the record to be played, means actuated by depression of the selected key for releasing the sliding frame and magazine to permit the same to be lowered by gravity, and said means being also adapted to stop further downward movement when the selected record in the magazine reaches a predetermined point.

3. In a device of the character described, a record magazine support, comprising a sliding frame, a record carrying magazine carried thereby, means for maintaining the sliding frame and the magazine supported thereby in a normal elevated position, a plurality of depressible keys, one for each record in the magazine, said keys serving the function of selecting the record to be played, means actuated by the depression of the selected key for releasing the sliding frame and magazine to permit the same to be lowered by gravity, and said means being also adapted to stop further downward movement when the selected record in the magazine reaches a predetermined point, and means for automatically regulating the speed of the sliding frame and the magazine when it is being lowered.

4. In a device of the character described, a record magazine support, comprising a sliding frame, a record carrying magazine carried thereby, means for maintaining the sliding frame and the magazine supported thereby in a normal elevated position, a plurality of depressible keys, one for each record in the magazine, said keys serving the function of selecting the record to be played, means actuated by the depression of the selected key for releasing the sliding frame and magazine to permit the same to be lowered by gravity, and said means being also adapted to stop further downward movement when the selected record in the magazine reaches a predetermined point, means for automatically regulating the speed of the sliding frame and the magazine when it is being lowered, a turntable for the reception of the records, and means for automatically transferring the selected record from the magazine to the turntable when the magazine is lowered to the point of removal.

5. In a device of the character described, the combination with a sliding frame of a detachable record carrying magazine, said magazine comprising a pair of uprights, inclined aligned arms on each upright and adapted to receive and support the records, a base member on the uprights adapted to support the lower end of the magazine with relation to the sliding frame, and a pair of hook shaped lugs on the upper ends of the uprights adapted to engage and secure the upper end of the magazine with relation to the sliding frame.

6. In a phonograph of the character described, a cabinet, a turntable within the cabinet, a record magazine adjacent the turntable, a series of key-like members arranged on the exterior of the cabinet, the keys agreeing in number with the records in the magazine, and means whereby actuation of one of the keys will cause gravitational downward movement of the magazine to a predetermined point to permit a record to be removed from the magazine and deposited on the turntable and returned therefrom to the magazine when played.

7. In a phonograph of the character described, a cabinet, a turntable within the cabinet, a tone arm supporting a reproducer and adapted to co-act with the turntable, a record containing magazine positioned adjacent the turntable, and movable vertically with relation thereto, a plurality of key-like members arranged on the exterior of the cabinet, said keys agreeing in number with that of the records in the magazine and each key being identified with one record, means whereby the actuation of one of the keys will cause gravitational downward movement of the magazine and will position the record identified therewith for removal to the turntable, and means cooperating with said means for removing the record thus positioned to the turntable and returning it to the magazine upon completion of the playing of the record.

8. In a phonograph of the character described, a cabinet, a turntable within the cabinet, a tone arm supporting a reproducer and adapted to co-act with the turntable, a record containing magazine positioned adjacent the turntable, and movable vertically with relation thereto, a plurality of key-like members arranged on the exterior of the cabinet, said keys agreeing in number with that of the records in the magazine and each key being identified with one record, means whereby the actuation of one of the keys will cause gravitational downward movement of the magazine and will position the record identified therewith for removal to the turntable, means cooperating with said means for removing the record thus positioned to the turntable and returning it to the magazine upon completion of the playing of the record, and means for returning the magazine to its normal position after a played record has been returned thereto.

9. In a phonograph of the character described, a cabinet, a turntable within the cabinet, a reproducer positioned to co-act with the turntable, a record magazine positioned adjacent the turntable and movable vertically with relation thereto, said magazine comprising a frame, inclined arms on said frame for supporting superposed records, a plurality of key-like members arranged on the exterior of the cabinet, the same agreeing in number with that of the records in the magazine, and each key being identified with one record, means whereby the actuation of one of the keys will cause gravitational downward movement of the magazine and will position the record identified therewith for removal to the turntable, means for transferring the selected record to the turntable, means for moving the reproducer into engagement with the record when delivered to the turntable, means for automatically raising the reproducer with relation to the record when it has been played, and means cooperating with the last named means for returning the record to the magazine and for returning the magazine to its normal position.

10. In a device of the character described, an electric motor, a turntable driven thereby, a cam shaft adapted to be intermittently driven by the motor, a magazine adapted to support a plurality of records, a record transferring mechanism interposed between the magazine and the turntable, means for selecting and positioning a record with relation to the transferring mechanism, and means actuated by said means for forming a driving connection between the motor and the cam shaft.

11. In a device of the character described, an electric motor, a turntable driven thereby, a cam shaft adapted to be intermittently driven by the motor, a magazine adapted to support a plurality of records, a record transferring mechanism interposed between the magazine and the turntable, means for selecting and positioning a record with relation to the transferring mechanism, means actuated by said means for forming a driving connection between the motor and the cam shaft, a reproducer vertically movable with relation to the turntable, means actuated by the cam shaft for lowering the reproducer with relation to the turntable when a record is deposited thereon, means for disconnecting the driving connection between the motor and the cam shaft when the reproducer has been lowered, means actuated by the movement of the reproducer over the record for automatically connecting the driving connection between the cam shaft and the motor when the playing of the record has been completed means actuated by the cam shaft for raising the reproducer with relation to the record, means actuated by the cam shaft for returning the record to the magazine, and means actuated by the cam shaft for releasing the needle in the reproducer.

12. In a device of the character described, an electric motor, a turntable, means forming a driving connection between the turntable and the motor, a cam shaft, a clutch drive between the motor and the cam shaft, means for automatically engaging the clutch to impart a one-half revolution to the cam shaft while the record is delivered to the turntable, means for disconnecting the clutch to permit the cam shaft to remain idle during the playing of the record, means for automatically engaging the clutch when the record has been played, and means for again disengaging the clutch when another one-half revolution has been imparted to the cam shaft.

13. In a device of the character described, a driving motor, a tone arm, a vertically movable record carrying magazine, a cam shaft, and means actuated by movement of the magazine and tone arm for intermittently forming a driving connection between the motor and the cam shaft.

14. In a device of the character described, a driving motor, a tone arm, a vertically movable record carrying magazine, a cam shaft, means actuated by movement of the magazine and tone arm for intermittently forming a driving connection between the motor and the cam shaft, and other means for automatically breaking the driving connection twice during one revolution of the cam shaft.

15. In a device of the character described, a driving motor, a tone arm, a vertically movable record carrying magazine, a cam shaft, means actuated by movement of the magazine for forming a driving connection between the motor and the cam shaft, means for automatically disconnecting said drive when one-half revolution of the cam shaft has been completed, means actuated by movement of the tone arm for re-establishing the driving connection between the motor and the cam shaft, and other means for automatically disconnecting said drive when the revolution of the shaft is completed.

16. In a device of the character described, a driving motor, a tone arm, a vertically movable record carrying magazine, a cam shaft, means actuated by movement of the magazine and tone arm for intermittently forming a driving connection between the motor and the cam shaft, and means actuated by said driving connection for establishing a second driving connection through which movement is imparted to raise the magazine to a predetermined elevated position.

17. In a device of the character described, a driving motor, a tone arm, a vertically movable record carrying magazine, a cam shaft, means actuated by movement of the magazine and tone arm for intermittently forming a driving connection between the motor and the cam shaft, means actuated by said driving connection for establishing a second driving connection through which movement is imparted to raise the magazine to a predetermined elevated position, and means actuated by said second driving connection for breaking the circuit through the motor after the magazine has reached its elevated position.

18. In a device of the character described, a cam shaft, a motor, a clutch on the shaft, means for intermittently actuating said clutch to intermittently drive the cam shaft, a second clutch on the cam shaft, and means actuated by the first clutch for engaging the second clutch.

19. In a device of the character described, a cam shaft, a motor, a clutch on the shaft, means for intermittently actuating said clutch to intermittently drive the cam shaft, a second clutch on the cam shaft, means actuated by the first clutch for engaging the second clutch, a vertically movable record carrying magazine, means actuated by the second named clutch for raising the magazine to a predetermined elevated position, means for locking the magazine when in said elevated position, and means actuated by said second named clutch for breaking the circuit through the motor when the magazine has been locked in its elevated position.

20. In a phonograph, in combination, a reproducer, a cam shaft, a needle holder on the reproducer, a turnably mounted needle discharging tube, a gage plate carried by the tube, and means actuated by the cam shaft for imparting a turning movement to the tube to swing the tube and gage plate alternately into alignment with the needle holder.

21. In a phonograph, in combination, a reproducer, a cam shaft, a needle holder on the reproducer, a turnably mounted needle discharging tube, a gage plate carried by the tube, means actuated by the cam shaft for imparting a turning movement to the tube to swing the tube and gage plate alternately into alignment with the needle holder, said means comprising a fork-shaped arm pivotally mounted adjacent the cam shaft, a cam on the shaft alternately engageable with the opposite sides of the fork-shaped arm to impart a rocking movement thereto, a crank arm on the tube, and a connection between the crank arm and one of the forks of the first named arm.

22. In a phonograph, in combination, a tone arm, a reproducer, a cam shaft, a pivotally mounted arm supporting the tone arm, and means actuated by the cam shaft for imparting a rocking movement to the arm to raise and lower the tone arm and reproducer, said tone arm and reproducer also having a swinging movement, and means actuated by a swinging movement of the tone arm for imparting a further movement to the pivoted arm.

23. In a phonograph, in combination, a tone arm, a reproducer, a cam shaft, a pivotally mounted arm supporting the tone arm, and means actuated by the cam shaft for imparting a rocking movement to the arm to raise and lower the tone arm and reproducer, said tone arm and reproducer also having a swinging movement, means actuated by a swinging movement of the tone arm for imparting further movement to the pivoted arm, a driving motor, and means actuated by said last named movement of the pivotally mounted arm for imparting a driving action between the motor and the cam shaft.

JOHN L. VAUGHN.